United States Patent [19]

Trubiano

[11] Patent Number: 4,683,609
[45] Date of Patent: Aug. 4, 1987

[54] SHOPPING CART HANDLE HAVING AN INTEGRAL LOCK PIN

[75] Inventor: Antoine Trubiano, Pointe Aux Trembles, Canada

[73] Assignee: Cari-All Inc., Quebec, Canada

[21] Appl. No.: 849,385

[22] Filed: Apr. 8, 1986

[51] Int. Cl.⁴ .............................................. B25G 3/26
[52] U.S. Cl. ........................... 16/114 R; 16/DIG. 24; 40/308; 403/22; 403/260
[58] Field of Search ......... 16/111 R, 114 R, DIG. 24, 16/DIG. 40; 280/33.99 A, 289 H; 403/22, 258, 259, 260; 40/306, 308, 309

[56] References Cited

U.S. PATENT DOCUMENTS

| | | | |
|---|---|---|---|
| 2,932,369 | 4/1960 | Huguenin | 403/22 |
| 2,944,642 | 7/1960 | Evans | 403/22 |
| 2,962,827 | 12/1960 | Lachance et al. | 40/308 |
| 3,348,326 | 10/1967 | Lachance | 40/308 |
| 4,458,420 | 7/1984 | Davis | 16/DIG. 24 X |

FOREIGN PATENT DOCUMENTS 1098560  3/1981  Canada .................................. 40/308

Primary Examiner—Fred Silverberg
Attorney, Agent, or Firm—Oblon, Fisher, Spivak, McClelland, & Maier

[57] ABSTRACT

A handle for a shopping cart comprised of elongated tubular member having opposed securable ends. At each end of the tubular member there is provided a lock pin formation which extends outwardly thereof to be received in an arresting passageway of an attachment portion of a respective handle support arm secured to a shopping cart. A fastener element secures the ends of the tubular member to a respective one of the support arms and extends axially into the tubular member for retention of the lock pin formation in the passageway thereby preventing axial rotation of the tubular member. The end cross sections of each tubular member also constitutes an arresting formation which is nested in a retention cavity formed in the handle attachment portion of each of the handle support arms. This formation is received in close fit in the retention cavity to further prevent axial rotation of the handle.

4 Claims, 5 Drawing Figures

U.S. Patent   Aug. 4, 1987   4,683,609
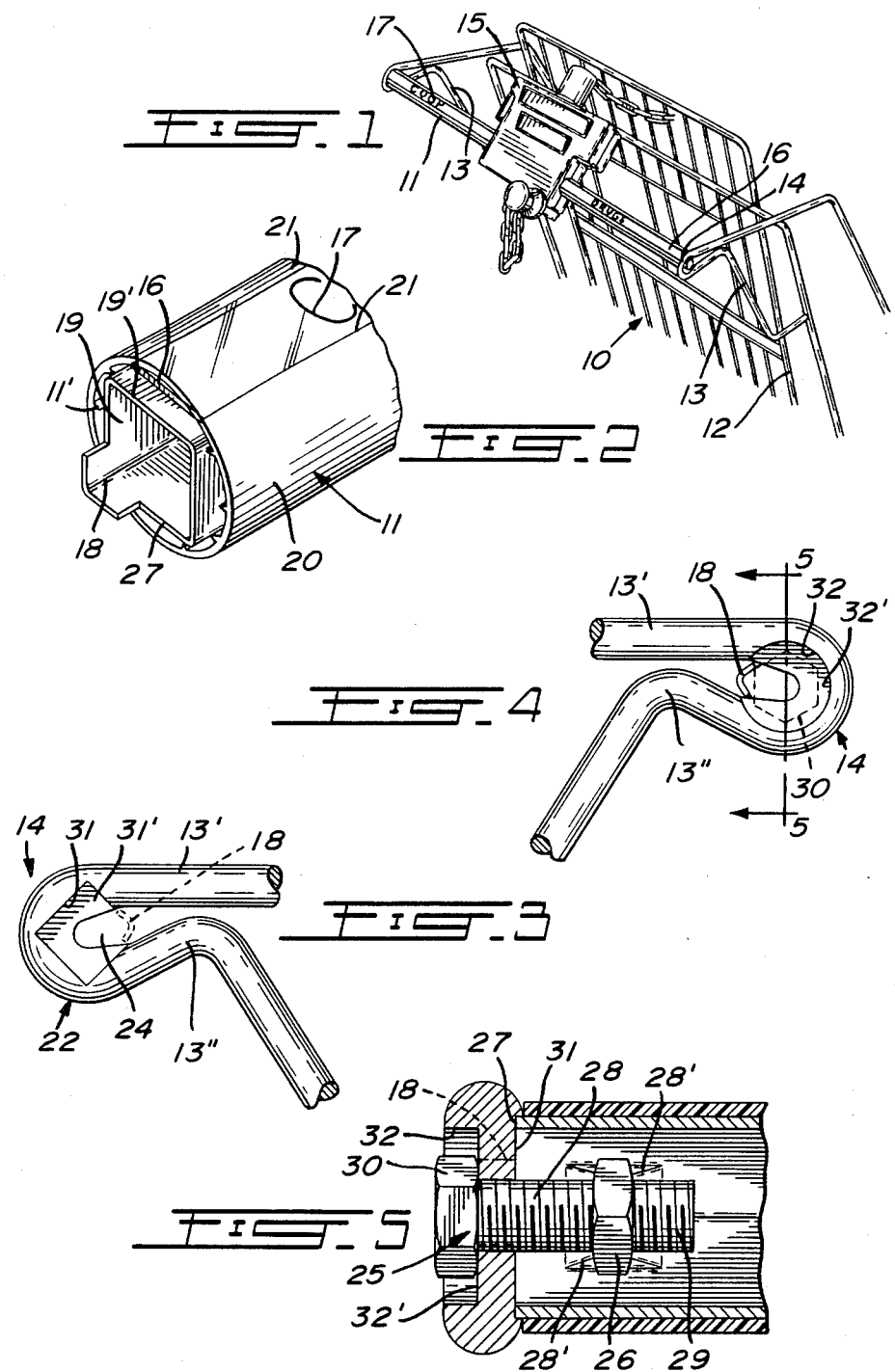

4,683,609

SHOPPING CART HANDLE HAVING AN INTEGRAL LOCK PIN

BACKGROUND OF THE INVENTION

1. Field of the Invention

The present invention relates to an improved shopping cart handle attachment which prevents axial rotation of the tubular handle member.

2. Description of Prior Art

It is desirable to provide an attachment for the elongated tubular handle of the shopping cart whereby to prevent axial rotation thereof. With the advent of new uses of the handle to display advertising material, such as the name of the store where the shopping cart is used and to further identify the owner of the shopping cart, it is desirable that the handle not be rotatable whereby to displace and conceal this information which is usually provided in a small strip form which is usually located under a transparent sleeve provided over the handle member. Furthermore, it is now becoming customary to install locking devices on these handles whereby to interlock shopping carts when they are nested together in a group. These locking devices are usually interlocked with one another via a chain link associated with each lock and the handle is thus subjected to heavy torsion loads when a series of nested carts interconnected to one another are pulled. This load is transferred on the handle member via the lock device causing the handle to rotate axially and thus rendering the locking device inoperable and further rotating or displacing the position of the advertisement strip making it illegible.

SUMMARY OF INVENTION

It is a feature of the present invention to provide a novel attachment means to permit easy installation of the handle and prevent axial rotation thereof.

Another feature of the present invention is to provide a novel handle construction for a shopping cart and wherein a lock pin formation is formed at each end of a tubular member of the handle and received in an arresting passageway formed in an attachment portion of a respective handle support arm secured to the shopping cart.

Another feature of the present invention is to provide a novel handle attachment means and wherein the cross-sectional configuration of the tubular member forming the handle constitutes an arresting formation which is received in a retention cavity formed in the handle attachment portion of a respective one of the handle support arms which are secured to the shopping cart.

According to the above features, from a broad aspect, the present invention provides a handle for a shopping cart comprising an elongated tubular member having opposed securable ends. Attachment means is provided in each of these ends and includes a fastener element and an arresting means preventing axial rotation of the tubular member. The arresting means comprises a lock pin formation secured at each of the ends and extending outwardly thereof to be received in an arresting passageway of an attachment portion of a respective handle support arm secured to a shopping cart. The fastener element is secured to the attachment portion of the support arm and extends axially in the tubular member for retention of the lock pin formation in the passageway, thereby preventing axial rotation of a tubular member.

BRIEF DESCRIPTION OF DRAWINGS:

A preferred embodiment of the present invention will now be described with reference to the example thereof as illustrated by the accompanying drawings in which:

FIG. 1 is a perspective view of a portion of the rear wall of a shopping cart showing the handle construction;

FIG. 2 is a partly fragmented perspective view of an end of the shopping cart handle of the present invention;

FIG. 3 is a partly fragmented end view of the handle attachment portion of a handle support arm showing the retention cavity and the location of the lock pin formation;

FIG. 4 is a fragmented end view of the handle attachment portion on the opposed side of FIG. 3 and showing the bolt head receiving cavity and the location of the lock pin formation in the arresting passageway; and FIG. 5 is a cross-section view along cross section lines 5—5 of FIG. 4 illustrating the manner in which the end of the handle of the present invention is secured to the handle attachment portion of a handle support arm.

DESCRIPTION OF PREFERRED EMBODIMENT

Referring now to the drawings, and more particularly to FIG. 1, there is shown generally at 10, the rear end portion of a shopping cart. An elongated tubular handle member 11 is secured spaced from the rear wall 12 of the shopping cart by a pair of handle support arms 13 which are formed from a wire member shaped to define a handle attachment portion 14. The opposed ends of the handle 11 define securable ends which are secured to the handle attachment portion 14, as will be described later.

As also shown in FIG. 1, a locking device 15 is illustrated and secured centrally of the handle portion. These lock devices are used to interlock shopping carts when nested together. Whenever a secured shopping cart is displaced or pulled, the locking device 15 is given a jolt from its attachment end thereof and this jolt is transmitted to the handle 11 as a torsion load or force, causing the handle 11 to axially rotate. Also, these handles are usually provided with insert strips 16 to display some advertising words, such as 17, and this is usually aligned whereby it is visible by the person pushing the cart. Accordingly, if the handle 11 was to be rotated axially, the wording 17 on the strip 16 may no longer be visible to the user, thus defeating the purpose of the advertising strip. The handle attachment of the present invention prevents this axial rotation of the handle.

Referring to FIG. 2, there is shown the arresting means or lock pin formation 18 which is formed integral with an elongated tubular member 19 which is a hollow metal tube of substantially square cross-section. The lock pin is a right-angled corner extension of the tube and thus the angle formed provides structural rigidity. Such a lock pin formation 18 is formed in opposed ends of the handle. Also, as hereinshown, the handle comprises the usual tubular sleeve 20 having at least a portion 21 thereof formed of transparent material and oriented such as to be aligned with the plastic strip slidingly disposed over the flat wall 19′ of the tube 19 under the tubular sleeve 20 whereby the wording 17 is visible through the transparent portion 21. The sleeve 11 is also provided with opposed ribs 11' to prevent the sleeve from rotating about the tubular member 19.

Referring now additionally to FIGS. 3 to 5, there is shown, in enlarged view, the construction of the handle attachment portion 14 of the handle support arms 13. As hereinshown, the attachment portion is provided by a U-shaped bend 22 which defines a trough between opposed wire portion 13' and 13" and defining therebetween an arresting passageway 24 whereby to receive the lock pin formation 18 in substantially close fit therein whereby to prevent axial rotation of the metal tubular member 19 and accordingly the handle 11 due to the abutment faces presented by opposed wire portions 13' and 13" maintaining the lock pin formation 18 captive therebetween in the passageway 24.

A fastener element 25 (see FIG. 5) is provided whereby to secure each opposed end of the tubular member 19 to the handle attachment portion 14 of a respective one of the handle support arms 13. The fastener element 25 comprises a threaded nut 26 retained in captive between opposed flat walls 19' of the tubular member 19 adjacent a respective end 27 thereof. The nut 26 is retained in position by indentations 28' formed in the metal tube 19 on opposite sides of the nut 26 and in opposite walls 19'. The fastener element also comprises a bolt 28 having a threaded shaft portion 29 for engagement with the nut 26 and a head 30.

In order to further prevent axial rotation of the handle 11, there is provided in combination with the lock pin formation 18 an arresting formation in each of the securable ends of the tubular member 19 and constituted by the cross-sectional configuration of the tubular member 19. This arresting formation is nestable within a retention cavity 31 which is stamped or otherwise formed in a respective one of the handle attachment portions 14. This retention cavity is configured as a substantially square cavity to receive a major portion of the square end wall 27 of the tubular member 19 therein. The fastener element 25 is disposed axially of the tubular member 19, as shown in FIG. 5, and retains the end wall 27 of the tubular member under tension against the flat wall 31' of the retention cavity 31. As shown in FIG. 3, the lock pin formation 18 extends through the passageway 24 and also facilitates assembly making sure the strip 16 is always properly positioned. The tubular member is arrested from axial rotation by both the retention cavity 31 and the lock pin formation 18.

As shown in FIGS. 4 and 5, the handle attachment portion 14 is further provided with another cavity 32 formed on the opposite side of the retention cavity 31 and in substantial alignment therewith. This other cavity 32 is deeper than the retention cavity 31 whereby to conceal a substantial portion of the bolt head 30 therein to conceal any jagged edge of the head. A lock washer (not shown) could also be provided under this bolt head 30. The other cavity 32 also has a flat wall 32' for the bolt head 30 to rest flush thereon.

It is within the ambit of the present invention to provide any obvious modifications of the example of the preferred embodiment described herein, provided such modifications fall within the scope of the appended claims.

I claim:

1. A handle for a shopping cart, said handle comprising an elongated tubular member of square cross-section and having opposed securable ends, a pair of spaced apart handle support arms secured to said shopping cart for securement of said handle thereto, attachment means in each said ends of said tubular member and including a fastener element and arresting means preventing axial rotation of said tubular member, said arresting means comprising the combination of a lock pin extension formed at each said ends of said tubular member and extending outwardly thereof, and a retention cavity formed in a handle attachment portion of each said handle support arms, said lock pin extension being received in an arresting passageway of an attachment portion of an associated handle support arm, said retention cavity being of square cross-section for receiving in close fit therein a respective one of said opposed securable ends, said fastener element being secured to said attachment portion of said support arm and extending axially in said tubular member for retention of said lock pin extension in said passageway thereby preventing axial rotation of said tubular member, said fastener element also retaining said opposed securable ends in tension in their respective retention cavity, said elongated tubular member is a hollow metal tube, said lock pin extension being a right angled corner unitary extension of said tube to provide a structural lock pin.

2. A handle as claimed in claim 1 wherein said handle support arm is formed from a wire member which is bent to define a handle attachment portion, said attachment portion having a U-shaped bend, said bend defining a trough between opposed wire portions of said bends, said retention cavity being a square configured stamping in said wire on one side of said bend and extending in the U-shaped region thereof over said trough and across a region of said opposed wire portions, said fastener element extending in close fit through said trough, said trough portion adjacent said fastener element also constituting said arresting passageway.

3. A handle as claimed in claim 1, wherein said fastener element is a bolt and a threaded member secured inside said tubular member adjacent said opposed securable ends, said handle support arms attachment portion having a further cavity formed opposite said retention cavity and on an opposed side thereof whereby to receive a head portion of said bolt therein.

4. A handle as claimed in claim 1, wherein there is further provided a tubular sleeve disposed over said tube, and a material strip slidingly disposed over a flat wall of said tube under said tubular sleeve, said sleeve having at least a transparent portion overlying said strip for visual access thereto, said arresting means preventing the displacement of the location of said strip by preventing axial rotation of said metal tube.

* * * * *